June 19, 1962  E. M. WALLACE  3,039,190
SHEARS

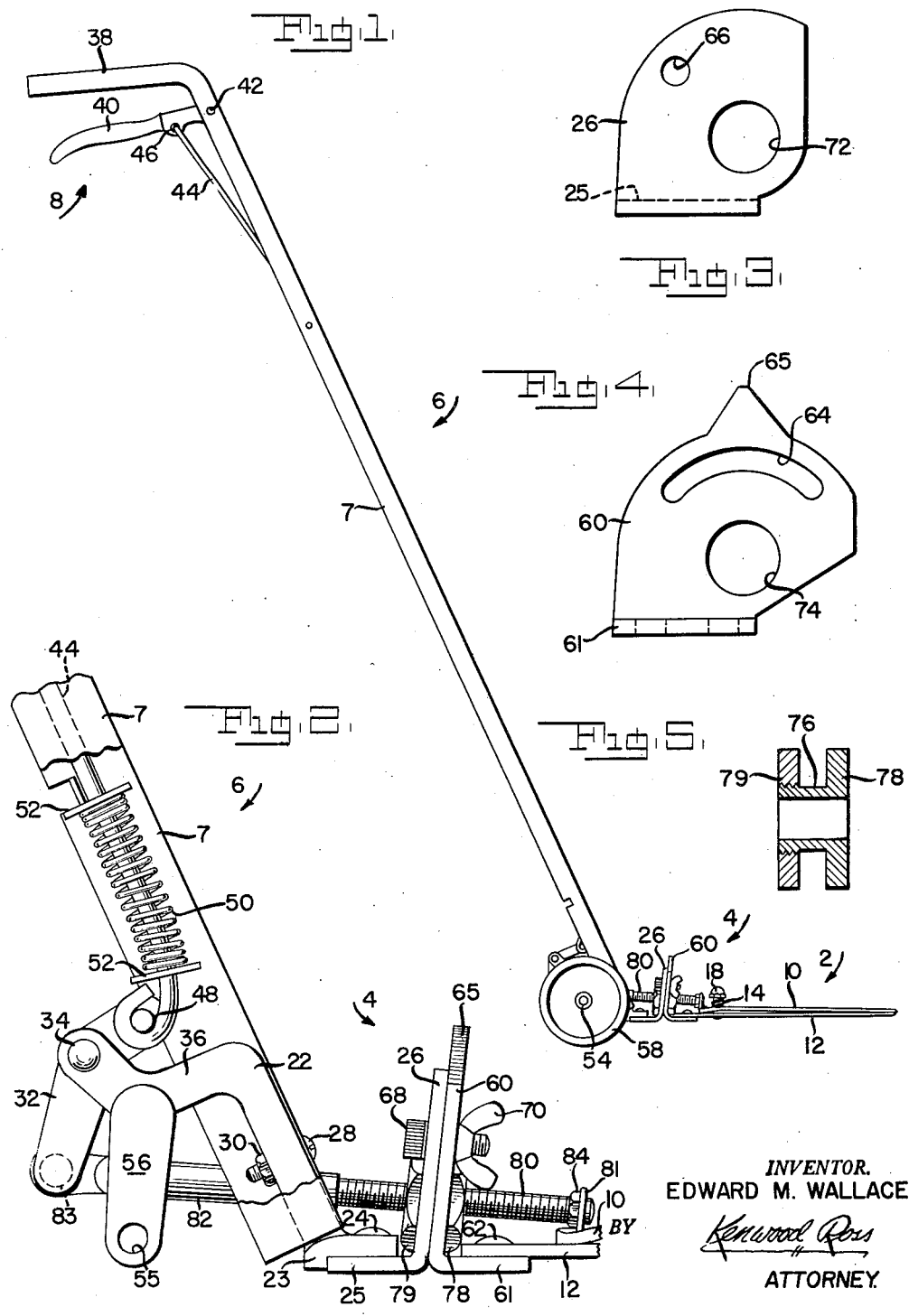

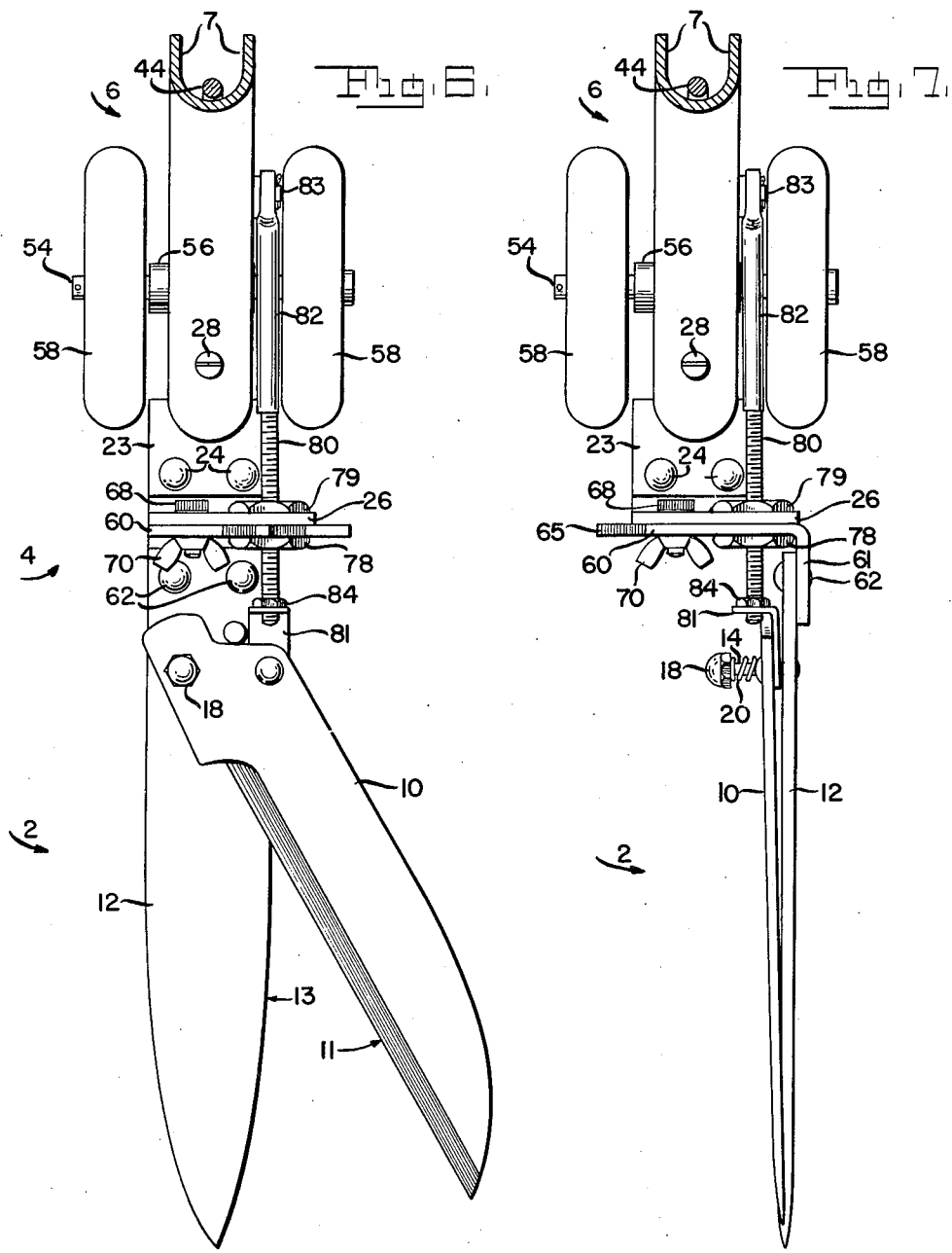

Filed Nov. 14, 1960  3 Sheets-Sheet 3

INVENTOR.
EDWARD M. WALLACE
BY Kenwood Ross
ATTORNEY.

United States Patent Office 3,039,190
Patented June 19, 1962

3,039,190
SHEARS
Edward M. Wallace, 55 Benedict Ave.,
Longmeadow, Mass.
Filed Nov. 14, 1960, Ser. No. 69,235
11 Claims. (Cl. 30—248)

The present invention relates to new and useful improvements and structural refinements in any device having a shearing, cutting, clipping, or scissors action in which two cutting blades are operated relative to each other so that their cutting edges cross each other.

It is a primary object of the present invention to provide an adjustable multi-purpose shears so constructed that the cutting or shearing means may be selectively positioned so as to be operable in fully horizontal or vertical planes as well as in planes angular to either of said planes, it being understood that such planes as herein identified mean planes relative to the generally horizontal plane of the surface of the ground being operated upon.

As a refinement of the invention, I envision a shears of the type adaptable for functioning as a combination grass trimmer and edger which may be readily adjusted whereby the associate coacting cutting blades may be selectively disposed for operational use in a horizontal plane, in a vertical plane, or in any plane therebetween, to offer the advantage of a shears which can be used to trim grass as well as to cut the ragged edges left about borders, garden paths, and generally inaccessible places following the conventional cutting of the lawn mower.

In a broad way, the invention may be defined as a combination of a pair of handles pivotally movable as to each other with a pair of cutting blades mounted in shearing relationship as to each other, with a so-called connecting or swivel link connecting one of the handles to one of the cutting blades, and with an adjustable means connecting the other of the cutting blades to the other of the handles, to the end that the cutting blades are selectively positionable for operational use in a generally horizontal plane and in a generally vertical plane and in any one of a multiplicity of planes therebetween, the adjustable means being of such construction as to facilitate the rotation of the cutting blades around axes which are substantially parallel to the longitudinal axis of one of the cutting blades.

The shearing device hereof may also be broadly defined as of the type having a fixed blade and a movable blade, the movable blade being actuated by a handle mounted pivotally with respect to the handle of the fixed blade, wherein the cutting blades and handles are interconnected by means which permit the rotative movement of the cutting blades substantially about their longitudinal axes in the closed position thereof.

Stated in still another way, the structure contemplates a pair of shearing blades, a primary means for actuating one of the shearing blades to effectuate a shearing action between the shearing blades of the pair, and a secondary means fixed to the other of the shearing blades for coaction with the primary means for guiding the shearing blades between fully horizontal and fully vertical positions of disposition through rotative movements substantially about the longitudinal axes of the shearing blades in their closed position.

Another of the salient objects of the present invention is to provide a novel adjustment means which may be readily incorporated both with shears of the hand-operated shear type and the so-called long-handled or off-set trimmer type, and by means of which the cutting blades of the shears may be positioned between horizontal and vertical planes, to the end that the device may be used alternatively as an ordinary grass shears or as an edger in trimming lawn borders and the like, as may be desired.

Now, I am aware of prior art constructions teaching the angularization of cutting blades in a multiplicity of planes relative to the handle members but I am also aware of a paucity of suitable instrumentation which has been the stimulus for these improvisations and I am further aware that, until now, no satisfactory construction has been forthcoming which combines in a simple manner the multiplicity of desirable features in a construction of this type.

All of the foregoing objects will in part be obvious and apparent and will in part be more fully pointed out as the nature of the invention is better understood in the progress of the disclosure below.

To the end of attaining these objects and any others hereinafter reasonably appearing, it will be explained that the invention consists substantially in the combination, configuration, location and function of parts, as herein described in detail, although it will be apparent that the physical embodiments delineated, albeit the preferred exemplifications, are only indicative of but certain of the multiplicity of ways in, and purposes for, which the principles of the invention may be employed.

In the drawings:

FIG. 1 is a side elevational view of a shears in the form of a long handled combination grass trimmer and edger embodying the principles of the invention for the purpose of illustrating one practical application thereof;

FIG. 2 is an enlarged, fragmentary, side elevational view of the shears shown in FIG. 1, with certain components having been omitted for purposes of clarity;

FIGS. 3 and 4 are enlarged, front elevational views of the base bracket and blade bracket components respectively;

FIG. 5 is an enlarged, sectional view of the bracket retaining component;

FIG. 6 is an enlarged, fragmentary, top plan view of the shearing sub-assembly of the shears shown in FIG. 1, with the shearing means being shown as disposed in a horizontal plane;

FIG. 7 is a view, similar to FIG. 6, with the shearing means being shown as disposed in a vertical plane; and FIG. 8 is a side elevational view of another type of shears embodying the principles of the invention.

Figure 9:
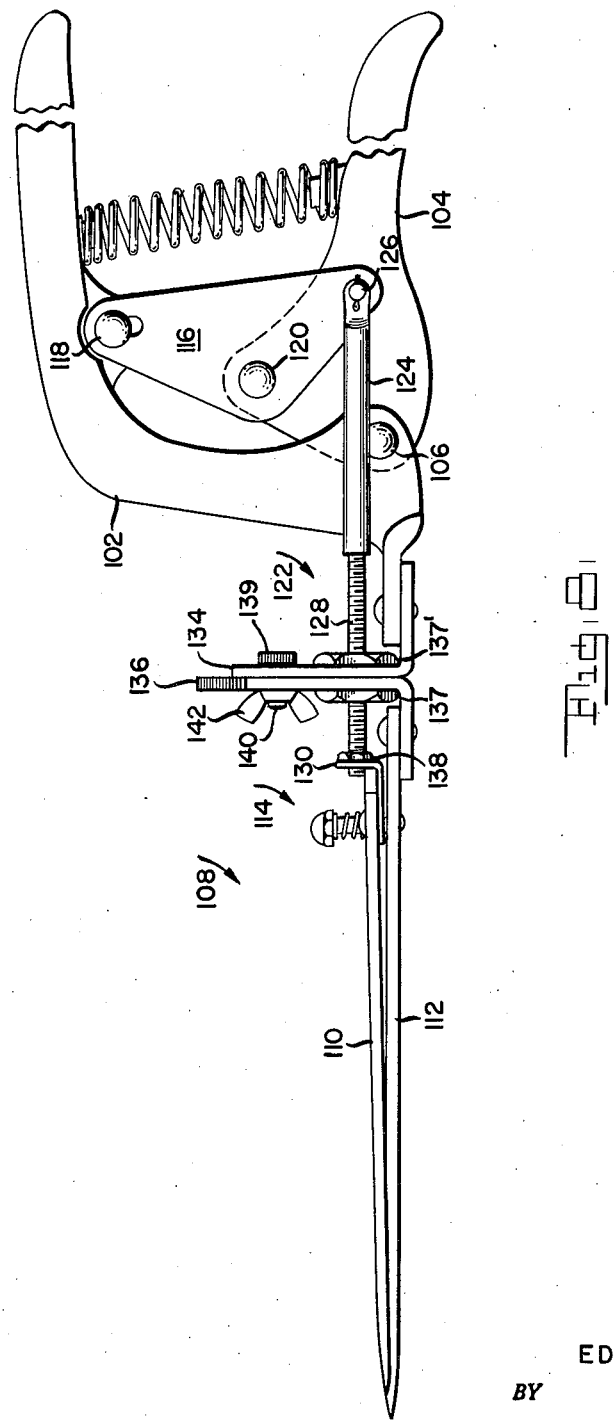

With continued reference now to the drawings, I have shown, in FIG. 1, a combination grass trimmer and edger embodying the principles of the invention and comprising a lowermost shearing or trimming portion generally indicated by 2, a pivotable bracket or stud or projection portion generally indicated by 4, a substantially vertically-extending staff portion generally indicated by 6, and an uppermost handle portion generally indicated by 8.

Said shearing or trimming portion includes a pair of cooperating and coacting cutting blades 10 and 12 having inner sharpened edges 11 and 13 respectively and being pivotally interconnected to permit their biased swinging movement between their conventional open and closed positions. Such pivotal connection may comprise a stud 14 which is fixedly secured to one of the cutting blades, as for example cutting blade 12, and a holding or adjusting nut 18 threadedly engageable therewith. The other of the cutting blades, as for example cutting blade 10, is loosely pivoted upon said stud. A spring 20 may be sleeved upon the stud to impart a normal biasing force to the cutting blades, in known manner, which spring is retained in position by the nut threaded on the stud, which nut serves to retain the cutting blades in assembled relationship so that one may be readily movable relative to the other for the cutting or trimming or shearing functions.

Said pivotable bracket or stud or projection portion includes a base 22 having a forwardly-facing foot 23 fixed as by rivets 24 or equivalent means to the rearwardly-extending foot 25 of base bracket or stud 26.

Said staff portion includes a staff 7 fixed near its lowermost extremity to base 22 as by a bolt 28 and a nut 30 threadedly engaged therewith or other appropriate fastening means, and a bell-crank or actuating member 32 pivoted at 34 to a rearwardly-facing arm 36 extending outwardly from base 22.

Conceivably staff 7 and base 22 and base bracket 26 could be made unitary or integral.

Said handle portion 8 includes an offset extension 38 of staff 7, serving as a fixed or stationary handle grip member, and a separate operating lever 40, having a forward extremity pivotally connected at 42 to staff 7 adjacent offset extension 38 in manner whereby operating lever 40 may be pivotally actuated with relation to offset extension 38 for movements towards and away therefrom for biasing between the conventional open and closed positions of the handle members.

An elongated pull rod 44 is extended along and relative to staff 7 and is engaged at its upper extremity by means of a laterally-extending projection extendable through a transverse opening 46 provided in operating lever 40 and is engaged at its looped lower extremity with a transversely-extending stud or pin 48 fixed to bell-crank 32.

A spring 50 is sleeved upon the lower portion of pull rod 44 and has opposite end faces, each embraceable against one of a pair of spaced, opposed, walls or projections or stops 52 which may be formed by the upsetting or lancing of portions of the wall of staff 7. Pull rod 44 is extendable through aligned openings in said walls 52.

If desired, a transversely extending axle 54 may be received in suitable aligned openings 55 of spaced, vertically-disposed hubs 56 fixed to and depending from base 22, which axle may carry wheels 58 in conventional manner, wherefor the structure may be readily rolled relative to a surface.

Base bracket or stud 26 is disposed in a face-to-face abutting relationship with a blade bracket or stud 60 having a forwardly-extending foot portion 61 fixedly secured as by rivets 62 or the like to the lower planar surface of cutting blade 12 adjacent its rearward extremity.

Blade bracket or stud 60 is provided with an arcuate slot 64 extendable therethrough which complements an annular opening 66 extendable through base bracket or stud 26 wherefor, as will shortly be appreciated, said blade bracket may be rotated relative to said base bracket within certain limits as defined by a screw 68 or the like which is receivable through opening 66 and slot 64 alignable therewith, which screw receives a nut 70 in threaded engagement therewith.

A gripping tab or projection 65 may be provided at one edge of blade bracket 60, whereby same may be more easily grasped.

Brackets 26 and 60 are provided with complemental and alignable annular openings 72 and 74 respectively, which openings function to loosely receive therethrough a neck 76 of an apertured retaining bolt 78. The neck of retaining bolt 78 is extendable through the adjacent brackets so that the shoulder of the retaining bolt is brought to bear snugly against the outer face of one of the brackets and a nut 79 is threadedly engaged with neck 76 so as to be brought snugly against the outer face of the other of the brackets in manner wherefor blade bracket 60 may be freely rotated relative to base bracket 26 with neck 76 functioning as the axis of such rotative motion.

By the tightening of nut 70 in known manner, base bracket 26 and blade bracket 60 may be held fast as to each other in any desired relative positions as allowed by the rotating of blade bracket 60 relative to base bracket 26 upon said axis and limited by the transverse of screw 68 between the opposite end walls of said arcuate slot.

A swivel or connecting link 80 is threadedly engaged at its rearward end in the open forward end of a tube-like sleeve 82 which, disposed intermediate bracket 26 and bell-crank 32, extends forwardly from and is pivotally mounted at 83 to said bell crank. Said swivel or connecting link 80 is loosely extendable through the openings through retaining bolt 78 and neck 76 thereof and has a forward end portion threadedly engageable with a mounting bracket 81 pivotally connected to the lower planar surface of cutting blade 10, with a nut 84 being threadedly received on the forward extremity thereof for holding same relative to said mounting bracket 81.

In operation, with staff extension 38 grasped in the hand of the user, operating lever 40 may be manually depressed toward said staff extension to impart an upward pull upon pull rod 44 and to effectuate the pivoting of bell-crank 32 upon pivot 34 converting said pulling force to a pushing force of connecting link 80 upon cutting blade 10, for effecting the closing thereof upon cutting blade 12.

As operating lever is released from the aforesaid position of depression, the opening of the cutting blades as to each other is effectuated.

To move the cutting blades from disposition in the horizontal plane, shown in FIG. 6, to disposition in the vertical plane, shown in FIG. 7, the user need only loosen nut 70 and grasp grip extension 65 of blade bracket 60 and exert a slight rotative force thereon to thereby cause said blade bracket to ride on the stem of screw 68 along the arcuate slot 64, and to cause the blades to rotate about an axis which approximates the longitudinal axis of the connecting link. In the process, said connecting link being threadedly engaged in mounting bracket 81 is rotated therewith, not impeding the rotative movement of the blades.

When the desired blade cutting angle has been attained, nut 70 is tightened and the pair of blades are once again locked relative to base bracket 26 for operational use.

It will be understood that the bracket portion herein shown, while representing the preferred embodiment, may be modified in various manners to the end that blade bracket 60 may revolve about any suitable means extending forwardly from and fixed relative to the lower extremity of staff 7. For example, said staff may be so configured as to eliminate the need for a separate bracket 26 and a unitary construction integral with the lower extremity of the staff could conceivably be substituted therefor. As a further example, blade bracket may, if desired, be configured in the form of a hollow, sleevelike, female member and the complemental base bracket may be in the form of a hollowed, mating, male member.

Additionally, in lieu of an arcuate slot in blade bracket 60 cooperating with a screw extending therethrough, said blade bracket may be provided with circumferentially spaced grooves or depressions along its outer periphery, within which grooves the forwardly extending stem of the screw might nest in seriatim as the blade bracket is rotated relative to the base bracket.

In FIG. 8, I have shown the principles of the invention as embodied in a pair of hand shears comprised generally of a frame member 102, shaped in the form of a handle, an operating member 104 pivoted at 106 to handle 102, and a lower shearing portion generally indicated by 108 and comprised of a movable blade 110 pivoted to a stationary blade 112 by a stud means generally indicated by 114.

A lever 116 is pivoted at 118 to handle 102 and is pivoted at 120 intermediate its upper and lower ends to operating member 104.

As handle 102 and operating member 104 are squeezed, operating member 104 and lever 116 are swung whereupon pivotal connection 120 of lever 116 and operating member 104 are moved forwardly.

A connecting link generally indicated by 122 has a cylindrical sleeve portion 124 journalled at its rearward end upon a stud 126 extending outwardly from lever 116, and a forward end portion 128 extending through a mounting bracket 130 extending upwardly from and pivotally connected to movable blade 110.

The rearward extremity of the forward portion 128 of said connecting link is threaded in the forward end of said cylindrical sleeve.

A base bracket 134 is fixed to the lower end of handle 102, while a blade bracket 136 is fixed to the lower surface of stationary blade 112.

Said connecting link 122 extends through retaining bolt 137 and nut 137' embracing brackets 134 and 136 and is secured relative to mounting bracket 130 as by a nut 138 threaded thereon and embracing said mounting bracket 130.

A screw 139, extending through said brackets 134 and 136, has a stem 140 which rides in an arcuate slot, not shown, provided in blade bracket 136 and is secured relative thereto as by a nut 142.

The blades 110 and 112 may be moved from disposition in a horizontal cutting plane to disposition in a vertical cutting plane by loosening nut 142 and revolving blade bracket 136 until the desired angle of disposition is reached, whereupon said nut is tightened to secure the blades thereat.

It will be understood that the construction of the hand shears just described may be modified to eliminate the base bracket thereby allowing the blade bracket to pivot directly upon a suitable means projecting from and integral with the handle.

As aforesaid, the blade bracket, if desired, may be in the form of a sleevelike female member and the complemental base bracket may be in the form of a mating male member.

It will be further understood that the invention may be embodied in trimmers or shears of the type wherein the movable blade is disposed below the stationary blade, or in cutting devices wherein the connecting link, leading from the actuating portion of the trimmer or shears to the blades, operates with a pulling rather than a pushing motion.

It will also be noted that the swivel connecting link hereof may be modified to incorporate the features of a ball and socket or universal joint, all without departing from the spirit of the invention.

In essence, the invention contemplates a construction having means for rotating the blades about an axis which approximates the longitudinal axes of the blades when in their closed position.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with apparatus which I believe to represent the best embodiments thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

The claims are desired to include within the scope thereof all of said suitable variations, modifications and equivalents by which substantially the results of the invention may be obtained through the use of substantially the same or equivalent devices or means.

Accordingly, limitation hereof should only be made as determined by a proper interpretation of the prior art and the scope of the subjoined claims, in which it is my intention to claim all novelty inherent herein as broadly as possible.

I therefore particularly point out and distinctly claim as my invention:

1. A shear device comprising, a pair of handles pivotally movable as to each other, a pair of cutting blades mounted in shearing relationship as to each other, actuating means for effectuating opening and closing movements of the cutting blades of said pair thereof responsive to the respective opening and closing movements of the handles of said pair thereof and including a spring-biased pull rod pivotally engageable at one end to one of the handles of said pair thereof and a bell crank pivotally engageable with the other end of said pull rod and with one of the handles of said pair thereof, a swivel link pivotally connected to said bell crank and to one of the cutting blades of said pair thereof, and adjustable means connecting the other of the cutting blades of said pair thereof to the other of the handles of said pair thereof whereby both cutting blades of said pair thereof are selectively positionable in any plane between fully horizontal and fully vertical planes by a rotative movement substantially about their longitudinal axes in the closed position thereof.

2. A shear device comprising, a pair of handles pivotally movable as to each other, a pair of cutting blades mounted in shearing relationship as to each other, actuating means for effectuating opening and closing movements of one of the cutting blades of said pair thereof relative to the other of the cutting blades of said pair thereof responsive to the respective opening and closing movements of one of the handles of said pair thereof relative to the other of the handles of said pair thereof and including a spring-biased pull rod pivotally engageable at one end to one of the handles of said pair thereof and a bell crank pivotally engageable with the other end of said pull rod and a swivel link pivotally interconnecting said bell crank and to one of the cutting blades of said pair thereof, and adjustable means connecting the other of the cutting blades of said pair thereof to the other of the handles of said pair thereof whereby both cutting blades of said pair thereof are selectively positionable in any plane between fully horizontal and fully vertical planes by a rotative movement substantially about the longitudinal axis of one of the cutting blades of said pair thereof.

3. A shear device comprising, a pair of handles pivotally movable as to each other, a pair of cutting blades mounted in shearing relationship as to each other, actuating means for effectuating opening and closing movements of one of the cutting blades of said pair thereof relative to the other of the cutting blades of said pair thereof responsive to the respective closing and opening movements of one of the handles of said pair thereof relative to the other of the handles of said pair thereof and including a spring-biased pull rod pivotally engageable at one end to one of the handles of said pair thereof and a bell crank pivotally engageable with the other end of said pull rod and a swivel link connecting one of the handles of said pair thereof to one of the cutting blades of said pair thereof, and adjustable means connecting the other of the cutting blades of said pair thereof to the other of the handles of said pair thereof whereby both cutting blades of said pair thereof are selectively positionable in any plane between fully horizontal and fully vertical planes while maintaining the angularity thereof relative to the handles of said pair thereof.

4. A multipurpose device for trimming and edging grass, said apparatus comprising, a pair of handles including a stationary handle and a movable handle pivotally connected thereto, a pair of cutting blades mounted in shearing relationship as to each other, actuating means for effectuating opening and closing movements of the cutting blades of said pair thereof responsive to the respective opening and closing movements of the handles of said pair thereof and including a spring-biased pull rod pivotally engageable at one end to one of the handles of said pair thereof and a bell crank pivotally engageable with the other end of said pull rod and a swivel link connecting one of the handles of said pair thereof to one of the cutting blades of said pair thereof, and adjustable means connecting the other of the cutting blades of said pair thereof to the other of the handles of said pair thereof whereby both cutting blades of said pair thereof are selectively positionable in any plane between fully horizontal and fully vertical planes by a rotative movement substantially about their longitudinal axes in the closed position thereof.

5. A shear device comprising, a pair of handles including a stationary handle and a movable handle pivotally connected thereto, a pair of cutting blades mounted in shearing relationship as to each other, actuating means for effectuating opening and closing movements of the cutting blades of said pair thereof responsive to the respective opening and closing movements of the handles of said pair thereof and including a spring-biased pull rod pivotally engageable at one end to one of the handles of said pair thereof and a bell crank pivotally engageable with the other end of said pull rod and a swivel link connecting one of the handles of said pair thereof to one of the cutting blades of said pair thereof, and adjustable means connecting the other of the cutting blades of said pair thereof to the other of the handles of said pair thereof whereby both cutting blades of said pair thereof are selectively positionable in any plane between a fully horizontal and a fully vertical plane by a rotative movement substantially about the longitudinal axis of one of the cutting blades of said pair thereof.

6. A dual purpose shears comprising, a pair of cutting blades having inner coacting shearing edges, pivotal connections between said cutting blades permitting relative swinging thereof between open and closed positions, a handle means disposed substantially vertically upwardly from said cutting blades, a base integral with said handle means, an actuating member pivotally connected to said base and swingable between the open and closed positions of said cutting blades, a pushable swivel link connected between one of said cutting blades and said actuating member, an operating lever pivotally connected to said handle means for swinging towards and away from said handle means, a rigid spring-influenced pull link connecting said operating lever to said actuating member, a base bracket fixed to said base, and a blade bracket fixed to said lower blade, said blade bracket being pivotally fixed to said base bracket permitting rotary movement of said blades between horizontal and vertical disposition.

7. Remotely operated shears for grass and the like comprising in combination, a fixed and a movable blade, pivotal connections between said blades for relative swinging thereof between open and closed positions, a base fixed to an elongated staff extending substantially vertically upwardly from said base, an actuating member pivotally connected to said base and swingable between open and closed positions of said blades, a push member pivotally interconnecting said movable blade and said actuating member, a handle fixed to said staff, an operating lever pivotally connected to said handle for swinging towards and away from said handle, a spring-biased pull rod extending through said staff and interconnecting said actuating member and operating lever, the pivotal connection of said push and actuating members and the pivotal connection of said pull rod and actuating member being relatively spaced on opposite sides of the pivotal connection of said actuating member and base whereby said movable blade is pushed to closed position by said push member as said lever pulls said pull rod, and means fixed to said base and one of said blades for guiding said blades rotatively in disposition between fully horizontal and fully vertical planes substantially about the longitudinal axis of one of said blades.

8. A multipurpose device for trimming and edging grass comprising, a pair of handles including a stationary handle and a movable handle pivotally connected thereto, a pair of cutting blades mounted in shearing relationship as to each other, a bell crank pivotally mounted on the fixed handle of said pair of handles, a link means for effectuating opening and closing movements of one of the cutting blades of said pair thereof in response to the respective opening and closing movements of the movable handle of said pair of handles, said link means including a spring-biased pull rod pivotally interconnecting the movable handle of said pair of handles and said bell crank and a swivel push link pivotally interconnecting one of the cutting blades of said pair thereof and said bell crank, and adjustable means connecting the other of the cutting blades of said pair thereof to the stationary handle of said pair of handles for effectuating the selective positioning of both cutting blades of said pair thereof in any plane between a fully horizontal plane and a fully vertical plane by a rotative movement of the cutting blades of said pair thereof substantially about the longitudinal axis of one of the cutting blades of said pair thereof in the closed position thereof.

9. In the multipurpose device for trimming and edging grass as set forth in claim 8 with said adjustable means effectuating the selective positioning of the cutting blades of said pair thereof about the longitudinal axes of the cutting blades of said pair thereof in the closed position thereof.

10. A shear device comprising, a fixed handle and a movable handle fixed thereto, a fixed cutting blade and a movable cutting blade in shearing relationship thereto, a bell crank pivotally mounted in said fixed handle, a spring-biased pull rod pivoted at its opposite ends to said movable handle and to said bell crank, a push link connecting said bell crank to said movable blade and including means for facilitating the rotation of said movable blade about the longitudinal axis of said push link, and adjustable means for pivotally connecting said fixed blade to both stationary handles whereby both cutting blades are selectively positionable in any plane about the longitudinal axis of said push link.

11. A shear device comprising, a pair of handles, one of the handles of said pair thereof being a stationary handle and one of the handles of said pair thereof being a movable handle pivotally movable relative to the stationary handle, a pair of cutting blades mounted in shearing relationship as to each other, actuating means for effecting opening and closing movements of the cutting blades of said pair thereof responsive to the respective opening and closing movements of the handles of said pair thereof and including said movable handle and a lever pivotally engageable with said stationary handle and actuated by the movement of said movable handle, and a pushable swivel link pivotally connected to said lever and to one of the cutting blades of said pair thereof, and adjustable means connecting the other of the cutting blades of said pair thereof to said stationary handle whereby both cutting blades of said pair thereof are selectively positionable in any plane between fully horizontal and fully vertical planes by a rotative movement substantially about their longitudinal axes in the closed position thereof.

References Cited in the file of this patent
UNITED STATES PATENTS

| | | |
|---|---|---|
| 2,679,096 | Wallace | May 25, 1954 |
| 2,679,097 | Wallace | May 25, 1954 |
| 2,777,196 | Zoetemelk | Jan. 15, 1957 |
| 2,873,525 | Wallace | Feb. 17, 1959 |
| 2,957,297 | Zoetemelk | Oct. 25, 1960 |